US012759125B2

(12) United States Patent
Miller et al.

(10) Patent No.: US 12,759,125 B2
(45) **Date of Patent: *Oct. 13, 2026**

(54) POWERED FASTENER DRIVER

(71) Applicant: MILWAUKEE ELECTRIC TOOL CORPORATION, Brookfield, WI (US)

(72) Inventors: Arik A. Miller, Shorewood, WI (US); Kirat S. Mokha, Milwaukee, WI (US); Mitchell A. Ellena, West Allis, WI (US); Marcus M. Wechselberger, Milwaukee, WI (US); David C. Graf, Greendale, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 19/214,199

(22) Filed: May 21, 2025

(65) Prior Publication Data

US 2025/0282039 A1 Sep. 11, 2025

Related U.S. Application Data

(63) Continuation of application No. 18/422,512, filed on Jan. 25, 2024, now Pat. No. 12,318,899.

(Continued)

(51) Int. Cl.
*B25C 1/04* (2006.01)
*B23Q 11/00* (2006.01)

(Continued)

(52) U.S. Cl.
CPC .............. *B25C 1/041* (2013.01); *B25C 1/047* (2013.01); *B25C 1/06* (2013.01); *B25C 7/00* (2013.01);

(Continued)

(58) Field of Classification Search
CPC ........... B25C 1/041; B25C 1/047; B25C 1/06; B25C 7/00; B25C 1/008; B23Q 11/0092; B25D 11/00; B25F 5/00; H02P 29/0027
See application file for complete search history.

(56) References Cited

U.S. PATENT DOCUMENTS 4,679,719 A 7/1987 Kramer
5,794,831 A 8/1998 Velan et al.

(Continued)

FOREIGN PATENT DOCUMENTS

CN 201300400 Y 9/2009
CN 205166854 U 4/2016

(Continued)

*Primary Examiner* — Michelle Lopez
(74) *Attorney, Agent, or Firm* — Michael Best & Friedrich LLP

(57) ABSTRACT

A powered fastener driver includes a housing, a cylinder within the housing, the cylinder containing a pressurized gas, a piston within the cylinder and movable from a top-dead-center position to a bottom-dead-center position, a driver blade movably coupled to the piston, a lifter, a drive unit configured to provide torque to the lifter, and a sensor. The driver blade has a plurality of teeth. The sensor is configured to detect one or more of the plurality of teeth and a controller in communication with the drive unit and the sensor. The controller is configured to count a number of the plurality of teeth detected by the sensor, compare the number of detected teeth to a predetermined number of teeth, and stop the drive unit when the number of detected teeth is less than the predetermined number of teeth.

20 Claims, 12 Drawing Sheets

Related U.S. Application Data

(60) Provisional application No. 63/591,844, filed on Oct. 20, 2023, provisional application No. 63/481,929, filed on Jan. 27, 2023.

(51) Int. Cl.

| | |
|---|---|
| ***B25C 1/00*** | (2006.01) |
| ***B25C 1/06*** | (2006.01) |
| ***B25C 7/00*** | (2006.01) |
| ***B25D 11/00*** | (2006.01) |
| ***B25F 5/00*** | (2006.01) |
| *H02P 29/00* | (2016.01) |

(52) U.S. Cl.
CPC .......... *B23Q 11/0092* (2013.01); *B25C 1/008* (2013.01); *B25D 11/00* (2013.01); *B25F 5/00* (2013.01); *H02P 29/0027* (2013.01)

(56) References Cited

U.S. PATENT DOCUMENTS 5,911,350 A 6/1999 Bolger et al.
6,679,410 B2 1/2004 Würsch et al.
6,776,320 B2 8/2004 Sprenger et al.
6,783,045 B2 8/2004 Shima et al.
6,796,476 B2 9/2004 Birk et al.
6,796,477 B2 9/2004 Chen
6,938,811 B2 9/2005 Ehmig et al.
6,971,568 B2 12/2005 Schiestl et al.
6,983,871 B2 1/2006 Shima et al.
6,986,450 B2 1/2006 Matthews et al.
7,004,366 B2 2/2006 Schiestl et al.
7,021,251 B2 4/2006 Ohmori et al.
7,048,164 B2 5/2006 Favre-Bulle et al.
7,108,164 B2 9/2006 Shima et al.
7,131,564 B2 11/2006 Matthews et al.
7,134,586 B2 11/2006 McGee et al.
7,137,541 B2 11/2006 Baskar et al.
7,145,329 B2 12/2006 Favre-Bulle
7,194,988 B2 3/2007 Ohmori et al.
7,275,505 B2 10/2007 Moeller et al.
7,285,877 B2 10/2007 Gorti et al.
7,299,963 B2 11/2007 Moeller et al.
7,331,098 B2 2/2008 Matthews et al.
7,427,007 B2 9/2008 Shima et al.
7,444,963 B2 11/2008 Tanaka
7,748,097 B1 7/2010 Matthews et al.
7,793,811 B1 9/2010 Pedicini et al.
7,854,360 B2 12/2010 Suda
7,905,377 B2 3/2011 Krondorfer et al.
7,934,565 B2 5/2011 Krondorfer et al.
8,011,441 B2 9/2011 Leimbach et al.
8,011,547 B2 9/2011 Leimbach et al.
8,167,182 B2 5/2012 Shima et al.
8,215,528 B2 7/2012 Matsunaga et al.
8,230,941 B2 7/2012 Leimbach et al.
8,267,296 B2 9/2012 Leimbach et al.
8,267,297 B2 9/2012 Leimbach et al.
8,286,722 B2 10/2012 Leimbach et al.
8,336,749 B2 12/2012 Largo
8,347,978 B2 1/2013 Forster et al.
RE44,001 E 2/2013 Pedicini et al.
8,387,718 B2 3/2013 Leimbach et al.
8,408,327 B2 4/2013 Forster et al.
8,412,179 B2 4/2013 Gerold et al.
8,434,566 B2 5/2013 Forster et al.
8,464,921 B2 6/2013 Shima et al.
8,523,035 B2 9/2013 Pedicini et al.
8,602,282 B2 12/2013 Leimbach et al.
8,622,271 B2 1/2014 Shima et al.
8,733,610 B2 5/2014 Pedicini
8,763,874 B2 7/2014 McCardle et al.
8,939,341 B2 1/2015 Pedicini et al.
9,321,162 B2 4/2016 Adachi et al.
9,381,633 B2 7/2016 Moore et al.
9,381,635 B2 7/2016 Moore et al.
9,469,021 B2 10/2016 Gregory et al.
9,486,904 B2 11/2016 Gregory et al.
9,498,871 B2 11/2016 Gregory et al.
9,533,408 B2 1/2017 Forster et al.
9,550,288 B2 1/2017 Moore et al.
9,555,530 B2 1/2017 Pedicini et al.
9,604,352 B2 3/2017 Kobayashi et al.
9,643,305 B2 5/2017 Gregory et al.
9,649,755 B2 5/2017 Gregory et al.
9,662,777 B2 5/2017 Pomeroy et al.
9,664,387 B2 5/2017 Gerold et al.
9,676,088 B2 6/2017 Leimbach et al.
9,731,408 B2 8/2017 Groer et al.
9,782,880 B2 10/2017 Moore et al.
9,827,658 B2 11/2017 Gregory et al.
9,873,189 B2 1/2018 Gerold et al.
9,937,608 B2 4/2018 Hahn et al.
10,160,108 B2 12/2018 Beck
10,213,911 B2 2/2019 Moore et al.
10,335,937 B2 7/2019 Moore et al.
10,414,033 B2 9/2019 Ekstrom et al.
10,456,897 B2 10/2019 Grandjean et al.
10,478,954 B2 11/2019 Leimbach et al.
10,654,154 B2 5/2020 Schnell et al.
10,710,227 B2 7/2020 Pomeroy et al.
10,717,178 B2 7/2020 Yamamoto et al.
10,723,005 B2 7/2020 Meyer et al.
10,759,029 B2 9/2020 Schnell et al.
10,786,891 B2 9/2020 Noguchi et al.
10,821,585 B2 11/2020 Kabbes et al.
10,850,377 B2 12/2020 Steurer
10,888,981 B2 1/2021 Gregory et al.
10,898,996 B2 1/2021 Heeb et al.
10,898,997 B2 1/2021 Yamamoto et al.
10,926,387 B2 2/2021 Moore et al.
10,926,390 B2 2/2021 Dittrich et al.
10,940,579 B2 3/2021 Watanabe et al.
10,967,491 B2 4/2021 Yasutomi et al.
10,987,790 B2 4/2021 Garber
11,007,629 B2 5/2021 Yamamoto et al.
11,034,006 B2 6/2021 Wierzchon
11,034,007 B2 6/2021 Leimbach et al.
11,103,987 B2 8/2021 Dittrich et al.
11,179,836 B2 11/2021 Gregory et al.
11,221,611 B2 1/2022 Abbott et al.
11,229,995 B2 1/2022 Gregory et al.
11,241,776 B2 2/2022 Leimbach et al.
11,247,320 B2 2/2022 Li et al.
11,279,014 B2 3/2022 Yamamoto et al.
11,338,422 B2 5/2022 Yamamoto et al.
11,376,722 B2 7/2022 Kondou et al.
11,396,095 B2 7/2022 Moore et al.
12,090,592 B2 9/2024 Bloomfield et al.
12,122,028 B2 10/2024 Miller et al.
12,318,899 B2 * 6/2025 Miller ..................... B25C 1/041
2007/0108250 A1 5/2007 Odoni et al.
2011/0067895 A1 3/2011 Nobe et al.
2011/0303428 A1 12/2011 Roth et al.
2011/0303728 A1 12/2011 Franz et al.
2011/0303733 A1 12/2011 Fielitz et al.
2013/0320063 A1 12/2013 Gregory et al.
2014/0001224 A1 1/2014 McNeill et al.
2014/0263535 A1 9/2014 Rajani et al.
2015/0136829 A1 5/2015 Howes
2015/0283690 A1 10/2015 Welte et al.
2016/0271748 A1 9/2016 Gerold et al.
2018/0126530 A1 5/2018 Pomeroy et al.
2019/0224831 A1 7/2019 Yamamoto et al.
2019/0224832 A1 7/2019 Watanabe et al.
2019/0224833 A1 7/2019 Watanabe et al.
2019/0375084 A1 12/2019 Bierdeman et al.
2020/0078897 A1 3/2020 Ypma
2020/0114500 A1 4/2020 Bierdeman et al.
2020/0130156 A1 4/2020 Takeuchi et al.
2020/0346333 A1 11/2020 Po et al.
2020/0391364 A1 12/2020 Yasutomi et al.
2021/0008701 A1 1/2021 Tan et al.
2021/0016424 A1 1/2021 Kabbes et al.

(56) References Cited

U.S. PATENT DOCUMENTS

| | | | |
|---|---|---|---|
| 2021/0023686 | A1 | 1/2021 | Tan et al. |
| 2021/0107125 | A1 | 4/2021 | Gregory et al. |
| 2021/0154816 | A1 | 5/2021 | Moore et al. |
| 2021/0154818 | A1 | 5/2021 | Watanabe et al. |
| 2021/0213595 | A1 | 7/2021 | Yasutomi et al. |
| 2021/0229251 | A1 | 7/2021 | Dittrich et al. |
| 2021/0347023 | A1 | 11/2021 | Carrier et al. |
| 2022/0080571 | A1 | 3/2022 | Gregory et al. |
| 2022/0105614 | A1 | 4/2022 | Robinson et al. |

FOREIGN PATENT DOCUMENTS

| | | | |
|---|---|---|---|
| CN | 108145658 | A | 6/2018 |
| CN | 110434808 | A | 11/2019 |
| CN | 210909849 | U | 7/2020 |
| DE | 9200961 | U1 | 4/1992 |
| DE | 102006053149 | A1 | 5/2008 |
| EP | 2383085 | A1 | 11/2011 |
| EP | 2883664 | A1 | 6/2015 |
| WO | WO2021001196 | A1 | 1/2021 |
| WO | WO2021242305 | A1 | 12/2021 |

* cited by examiner

POWERED FASTENER DRIVER

CROSS-REFERENCE TO RELATED APPLICATIONS

This application is a continuation of U.S. patent application Ser. No. 18/422,512 filed on Jan. 25, 2024, now U.S. Pat. No. 12,318,899, which claims priority to U.S. Provisional Patent Application No. 63/591,844 filed on Oct. 20, 2023, and U.S. Provisional Patent Application No. 63/481,929 filed on Jan. 27, 2023, the entire contents of all of which are incorporated herein by reference.

FIELD OF THE INVENTION

The present disclosure relates to power tools, and more specifically to powered fastener drivers.

BACKGROUND OF THE INVENTION

There are various fastener drivers used to drive fasteners (e.g., nails, tacks, staples, etc.) into a workpiece know in the art. These fastener drivers operate utilizing various means (e.g., compressed air generated by an air compressor, gas spring, or the like) know in the art. Over the lifetime of the fastener driver, components of the tool may wear, which can cause the driver to fail.

SUMMARY OF THE INVENTION

In some aspects, the techniques described herein relate to a powered fastener driver including: a housing; a cylinder within the housing, the cylinder containing a pressurized gas; a piston within the cylinder and moveable from a top-dead-center position to a bottom-dead-center position; a driver blade moveably coupled to the piston for driving a fastener into a workpiece, the driver blade having a plurality of teeth; a lifter configured to engage the plurality of teeth for returning the driver blade from the bottom-dead-center position toward the top-dead-center position; a drive unit configured to provide torque to the lifter, causing it to rotate; a sensor configured to detect one or more of the plurality of teeth; and a controller in communication with the drive unit and the sensor, the controller configured to: count a number of plurality of teeth detected by the sensor, compare the number of detected teeth to a predetermined number of teeth, and stop the drive unit when the number of detected teeth is less than the predetermined number of teeth.

In some aspects, the techniques described herein relate to a powered fastener driver including: a housing; a cylinder within the housing, the cylinder containing a pressurized gas; a piston within the cylinder and moveable from a top-dead-center position to a bottom-dead-center position; a driver blade moveably coupled to the piston for driving a fastener into a workpiece, the driver blade having a plurality of teeth; a frame supported within the housing; a lifter supported within the housing by the frame and configured to engage the plurality of teeth for returning the driver blade from the bottom-dead-center position toward the top-dead-center position; a drive unit configured to provide torque to the lifter, causing it to rotate; a lifter position sensing assembly configured to detect an angular position of the lifter at an end of a fastener driving cycle, the lifter position sensing assembly including a sensor coupled to the frame and a sensor target coupled for co-rotation with the lifter; and a controller in communication with the drive unit and the lifter position sensing assembly, the controller configured to stop the drive unit in response to the lifter position sensing assembly not detecting the angular position of the lifter at the end of the fastener driving cycle. Features and aspects of the disclosure will become apparent by consideration of the following detailed description and accompanying drawings.

Figure 1:
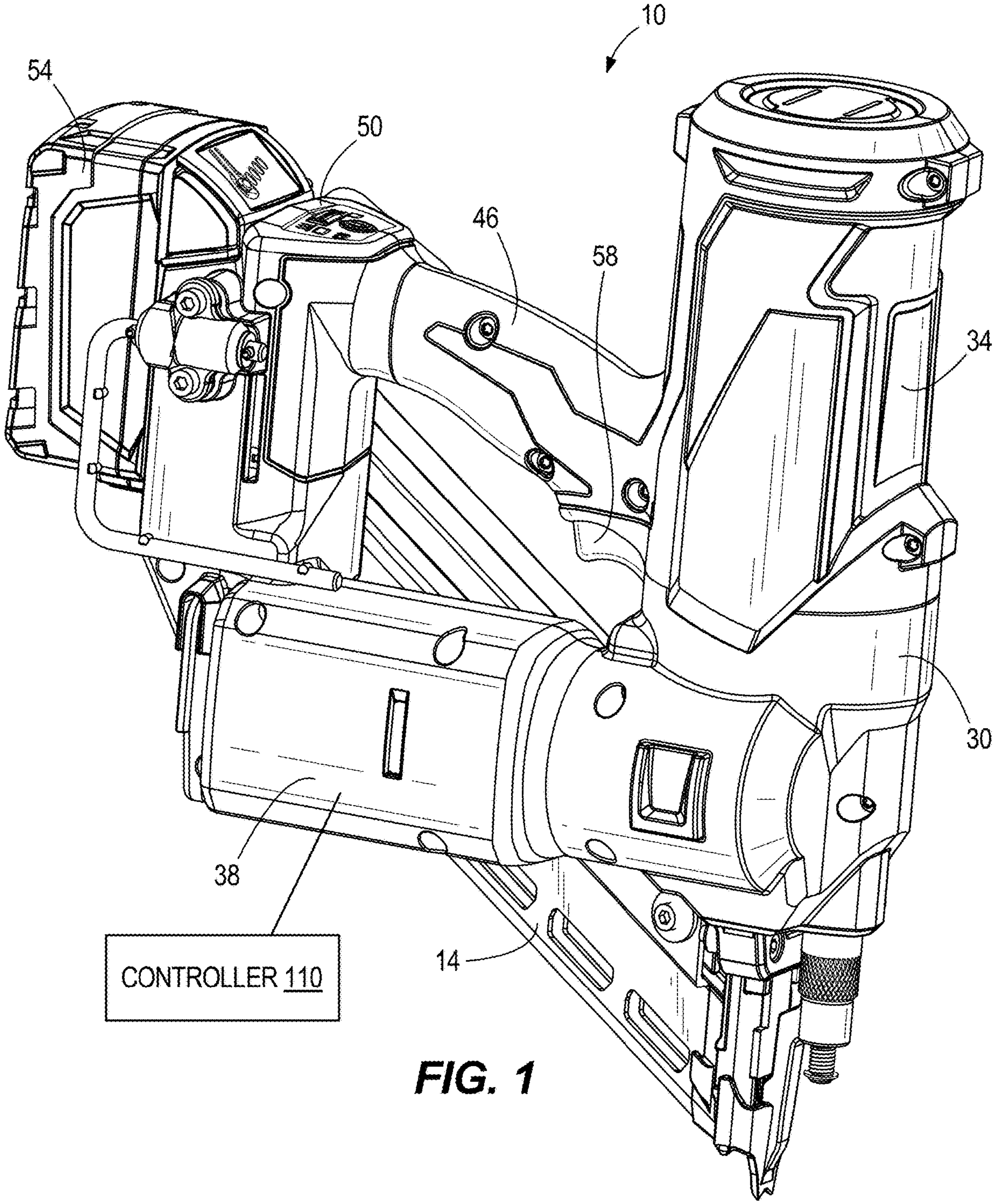
FIG. 1 is perspective view of a powered fastener driver.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
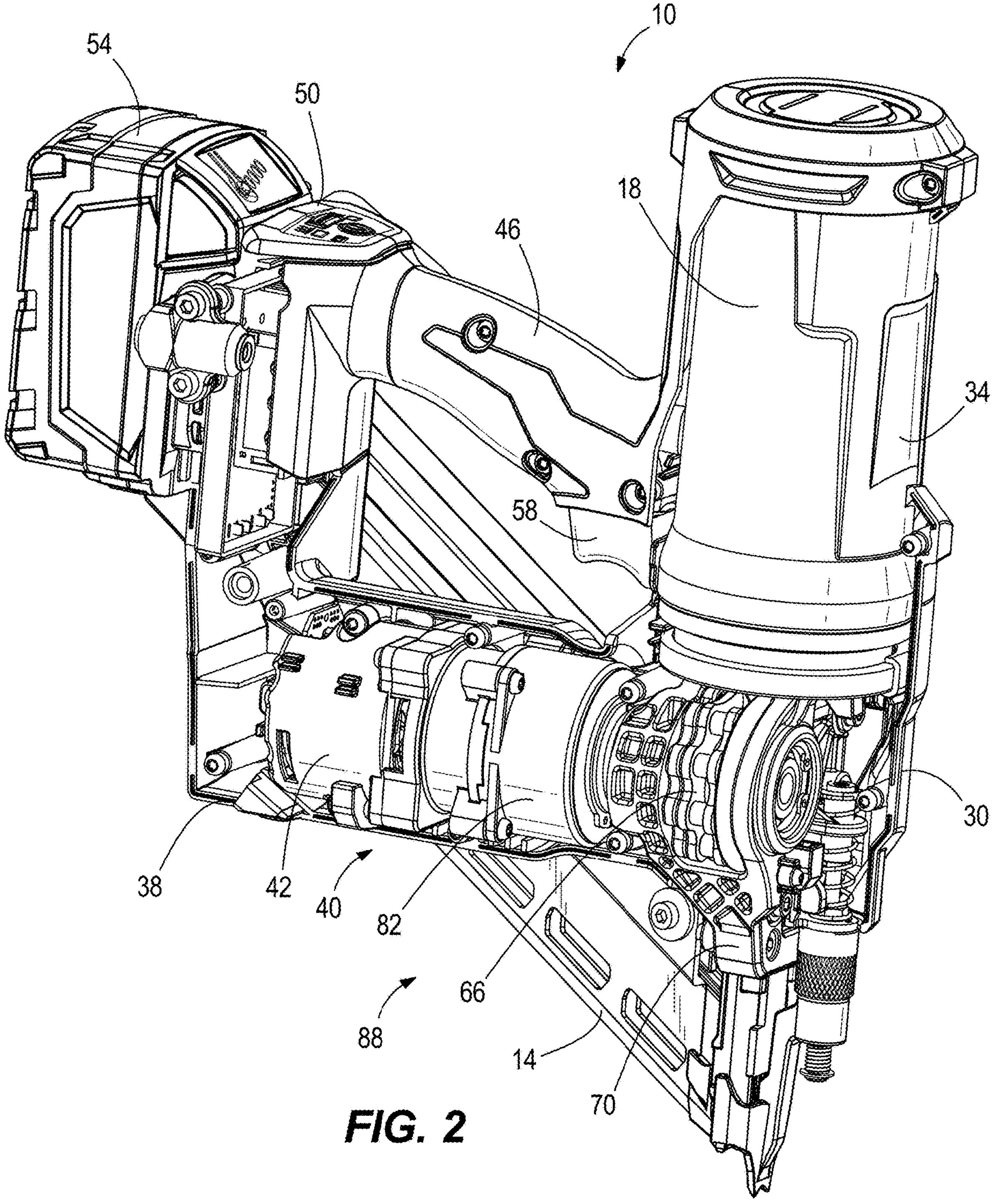
FIG. 2 is another perspective view of the powered fastener driver of FIG. 1, with portions of a housing removed.
Figure 3:
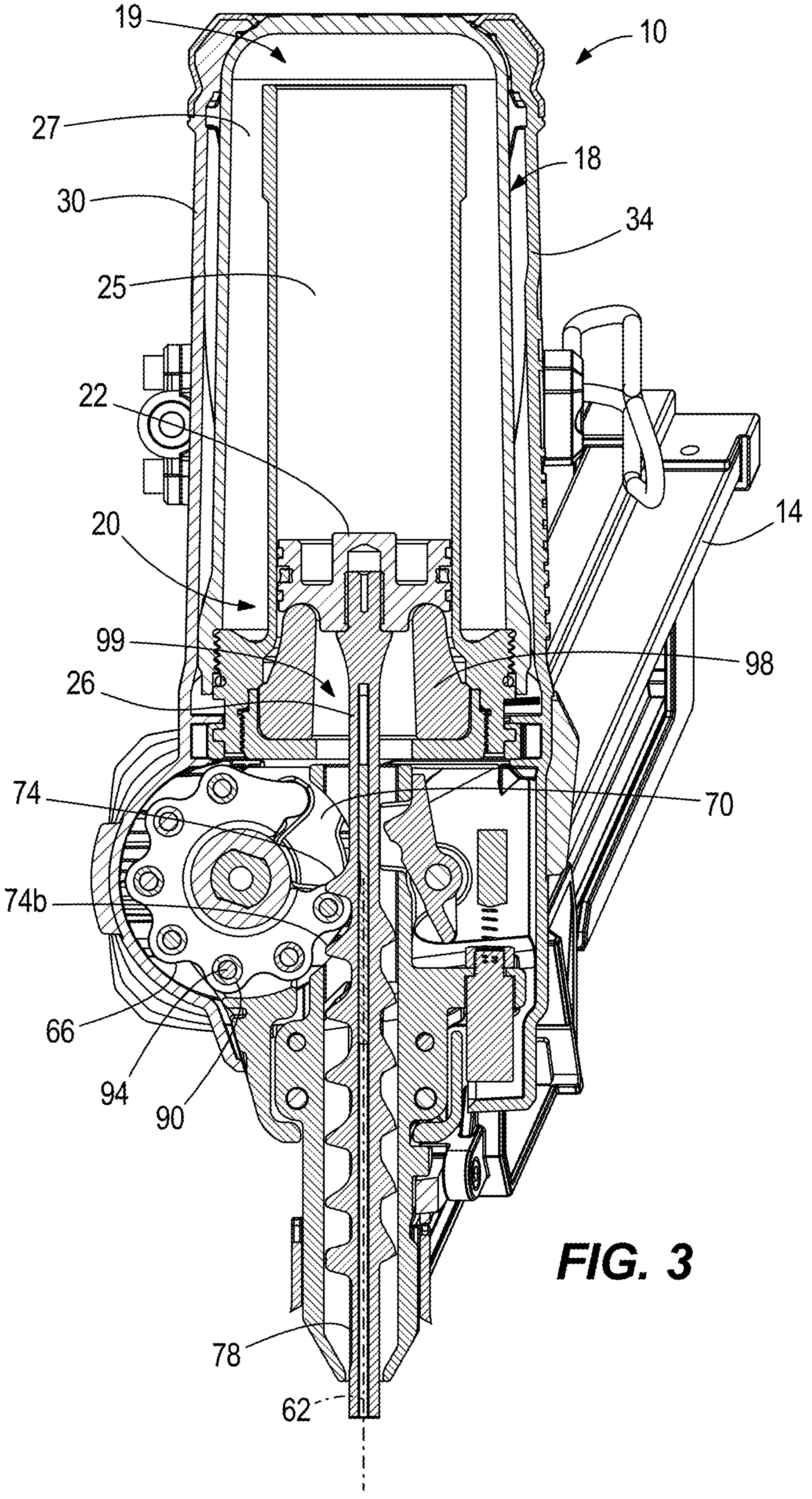
FIG. 3 is a partial cross-sectional view of the gas spring-powered fastener driver of FIG. 1.

With reference to FIGS. 1-3, a gas spring-powered fastener driver 10 is operable to drive fasteners (e.g., nails, tacks, staples, etc.) held within a magazine 14 into a workpiece. The fastener driver 10 includes a cylinder 18 containing a pressurized gas. A piston 22 is supported within the cylinder 18 and is moveable from a top-dead-center position to a bottom-dead-center position. The cylinder 18 includes a drive cylinder 25 having an open end in fluid communication with a storage chamber cylinder 27, which exposes the piston 22 positioned within the drive cylinder 25 to the pressurized gas in the storage chamber 27. The fastener driver 10 further includes a driver blade 26 that is attached to the piston 22 and moveable therewith.

The fastener driver 10 includes a housing 30 having a cylinder housing portion 34 and a motor housing portion 38 extending therefrom. The cylinder housing portion 34 is configured to support the cylinder 18, whereas the motor housing portion 38 is configured to support a drive unit 40.

The drive unit 40 includes an electric motor 42 and a transmission 82 positioned downstream of the motor 42. In addition, the illustrated housing 30 includes a handle portion 46 extending from the cylinder housing portion 34, and a battery attachment portion 50 coupled to an opposite end of the handle portion 46. A battery pack 54 is removably coupled to the battery attachment portion 50 and supplies electrical power to the drive unit 40. The handle portion 46 supports a trigger 58, which is depressed by a user to initiate a driving cycle of the fastener driver 10.

With reference to FIG. 3, the driver blade 26 defines a driving axis 62 and includes a plurality of driver blade teeth or lift teeth 74 formed along an edge 78 of the driver blade 26, which extends in the direction of the driving axis 62. In particular, the lift teeth 74 project laterally from the edge 78 relative to the driving axis 62. During a driving cycle, the driver blade 26 and piston 22 are moveable along the driving axis 62 between a top-dead-center (TDC) position and a bottom-dead-center (BDC) or driven position. The driver blade 26 may further be held in a ready position, which is positioned between the BDC position and the TDC position. The piston 22 is adjacent a top end 19 (FIG. 3) of the cylinder 18 in the TDC position, and the piston 22 is adjacent a bottom end 20 (FIG. 3) of the cylinder 18 in the BDC position. The fastener driver 10 further includes a rotary lifter 66 supported within the housing 30 by a frame 70 (FIG. 2). The rotary lifter 66 includes a plurality of rollers 90 supported by a plurality of pins 94. The lifter 66 is supported on a lifter frame 70 and receives torque from the drive unit 40, causing the lifter 66 to rotate. The lifter 66 and the drive unit 40 may be collectively referred to as a lifter assembly 88 (FIG. 2). As the lifter 66 rotates, the rollers 90 sequentially engage the lift teeth 74 formed on the driver blade 26 to return the driver blade 26 along the driving axis 62 from the BDC position toward the TDC position.

The cylinder 18 includes a bumper 98 located at the bottom end 20 of the cylinder 18. The bumper 98 has a generally annular, frusto-conical shape with a central bore 99 therethrough. The bore 99 is coaxial with the driving axis 62 such that the driver blade 26 extends through the bore 99. As the piston 22 and the driver blade 26 move from the TDC position toward the BDC position, the piston 22 impacts the bumper 98, which absorbs the impact from the piston 22 and stops the piston 22 in the BDC position. In some embodiments, the bumper 98 is constructed of a resilient material (e.g., rubber, elastomeric material, or the like.

Figure 5:
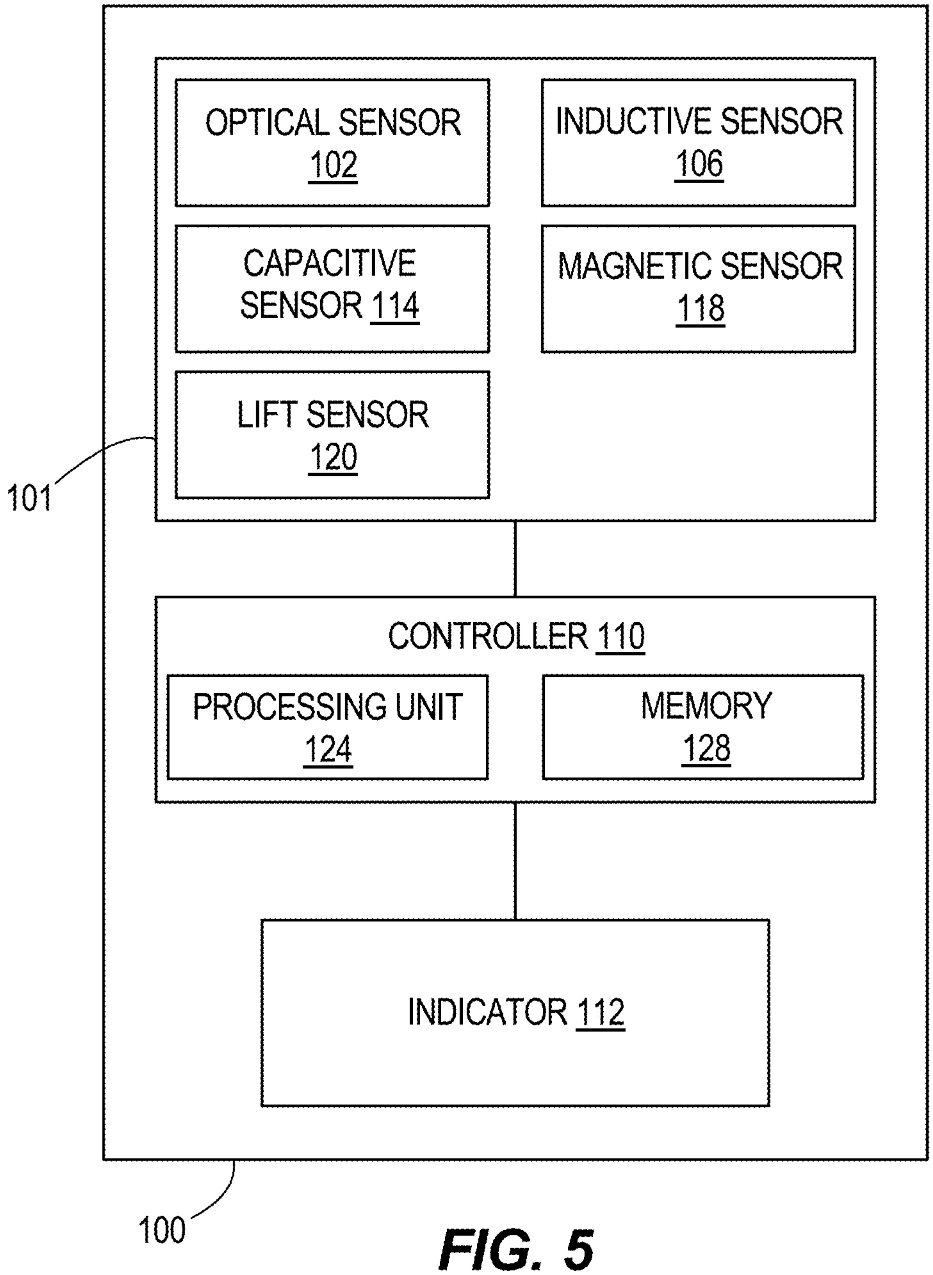
FIG. 5 is a schematic view of a control system of the powered fastener driver of FIG. 1.

As illustrated in FIG. 5, the fastener driver 10 includes a jam detection system 100 having a controller 110, one or more sensors 101 in communication with the controller 110, and an indicator 112 in communication with the controller 110. The controller 110 includes a plurality of electrical and electronic components that provide power, operational control, and protection to the components and modules within the controller 110 and/or the nailer 10. The indicator 112 may be exposed from an exterior of the housing 30 and may be configured as one or more of lights (e.g., a light-emitting diode or LED), a display panel, or the like. The controller 110 may selectively activate the indicator 112 to alert the operator that maintenance is required.

For example, the controller 110 may include, among other things, a processing unit 124 (e.g., a microprocessor, a microcontroller, or another suitable programmable device) and a memory 128. The memory 128 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The memory 128 is capable of storing an array of data described in detail below. The processing unit 124 is connected to the memory 128 and executes software instructions that are capable of being stored in a RAM of the memory 128 (e.g., during execution), a ROM of the memory 128 (e.g., on a generally permanent basis), or another non-transitory computer readable medium such as another memory or a disc. Software included in the implementation of the fastener driver 10 can be stored in the memory 128 of the controller 110. The software includes, for example, an interrupt service routine (ISR), firmware, one or more applications, program data, filters, rules, one or more program modules, and other executable instructions. The controller 110 is configured to retrieve from the memory 128 and execute, among other things, instructions related to the control processes and methods described herein. In other constructions, the controller 110 includes additional, fewer, or different components.

During operation of the fastener driver 10, a jam condition may occur from the drive blade 26 becoming stuck during its driving stroke somewhere between the TDC position and the BDC position. For example, a nail may buckle during a fastener driving cycle if it is unable to plunge into an underlying workpiece, jamming the buckled nail within the nosepiece of the driver 10 and preventing the driver blade 26 from reaching its BDC position. If the driver blade 26 is stopped between the TDC and BDC positions, the lifter rollers 90 may be unable to correctly mesh with the lift teeth 74, resulting in a jam condition in which the lifter 66 and driver blade 26 remain seized. As described in more detail below, the jam detection system 100 is configured to adjust an operating condition of the fastener driver 10 when a jam condition occurs. During fastener driving events, it is assumed that if the piston 22 engages the bumper 98 at the BDC position the rollers 90 will correctly mesh with the lift teeth 74. As such, as described above, jams typically occur in a fastener feeding area of the drive stroke (e.g., when the driver blade moves from the BDC position towards the TDC position).

Now with reference to FIG. 3, a jam condition may occur when the rollers 90 of the lifter 66 incorrectly mesh with the lift teeth 74. In some embodiments, an unclearable jam condition may occur when one of the rollers 90 engages an end portion 74*b* of one of the lift teeth 74 and is unable to roll to either side and lift the driver blade 26. When the jam detection system 100 determines that an unclearable jam condition occurs, the indicator 112 is activated to alert the operator that maintenance is required.

The one or more sensors 101 (i.e., "driver blade sensors") may include an optical sensor 102, an inductive sensor 106, a capacitive sensor 114, a magnetic sensor 118, and/or a lifter sensor 120. One or more of the optical sensor 102, the inductive sensor 106, the capacitive sensor 114, and magnetic sensor 118 are configured to detect a number of or each of the lift teeth 74 as the driver blade 26 is moved from the BDC position to the TDC position and as the driver blade 26 is released from the TDC position to the BDC position. The lifter sensor 120 that is configured to detect the angular position of the lifter 66. The combination of the lifter sensor 120 and one or more of the optical sensor 102, the inductive sensor 106, the capacitive sensor 114, and magnetic sensor 118 may be used in conjunction to detect whether a jam condition occurs.

Figure 4:
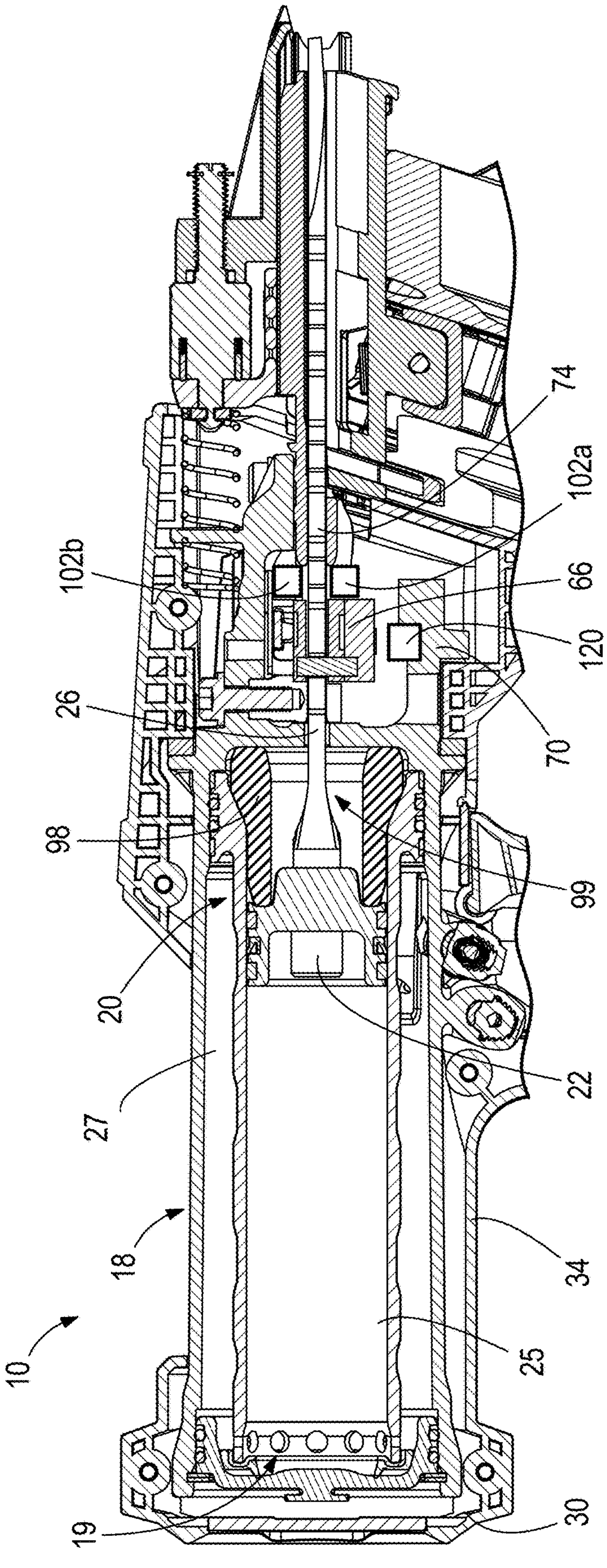
FIG. 4 is another partial cross-sectional view of the gas spring-powered fastener driver of FIG. 1, illustrating a sensor proximate a driver blade.

As shown in FIG. 4, the fastener driver 10 includes a phototransistor 102*a* (a type of optical sensor 102) mounted to the lifter frame 70 on a first side of the driver blade 26 and an infrared emitter 102*b* located on an opposite side of the driver blade 26. Separately, the lifter sensor 120 is coupled to the lifter frame 70 and is configured to detect an angular position of the lifter 66. As the driver blade 26 moves, a beam of light from the optical sensor 102 will be blocked when the lift teeth 74 intersect the beam. As such, the time that the beam is blocked can be used to calculate the width of the lift teeth 74 and time required for the driver blade 26 to move between predetermined positions (e.g., from the BDC position to the TDC position, the TDC position to the BDC position, and the BDC position to ready position). In other embodiments, the inductive sensor 106, the capacitive sensor 114, and/or magnetic sensor 118 may be used to detect the presence of the lift teeth 74 and determine a jam condition in a similar fashion as the optical sensor 102.

To determine whether a jam condition occurs, the controller 110 is configured to timestamp edges of the teeth 74 as the teeth 74 block or pass the beam of light from the optical sensor 102. When the driver blade 26 is released from the TDC position to the BDC position, the controller 110 determines whether a predetermined number of edges corresponding to the number of lift teeth 74 pass through the beam of light of the optical sensor 102. In some embodiments, the controller 110 is configured to count the number of teeth 74 instead of counting the edges. If the number of detected edges are equal to the predetermined number of edges within a predetermined amount of time, the controller 110 determines that the driver blade 26 has reached the BDC position without a jam condition present. It should be appreciated that the predetermined number of edges may be the edges of all of the teeth 74 or a portion of the teeth (e.g., more than 50 percent of the teeth 74). Additionally or alternatively, if the number of detected teeth are equal to the predetermined number of teeth within the predetermined amount of time, the controller 110 determines that the driver blade 26 has reached the BDC position without a jam condition present.

Figure 6:
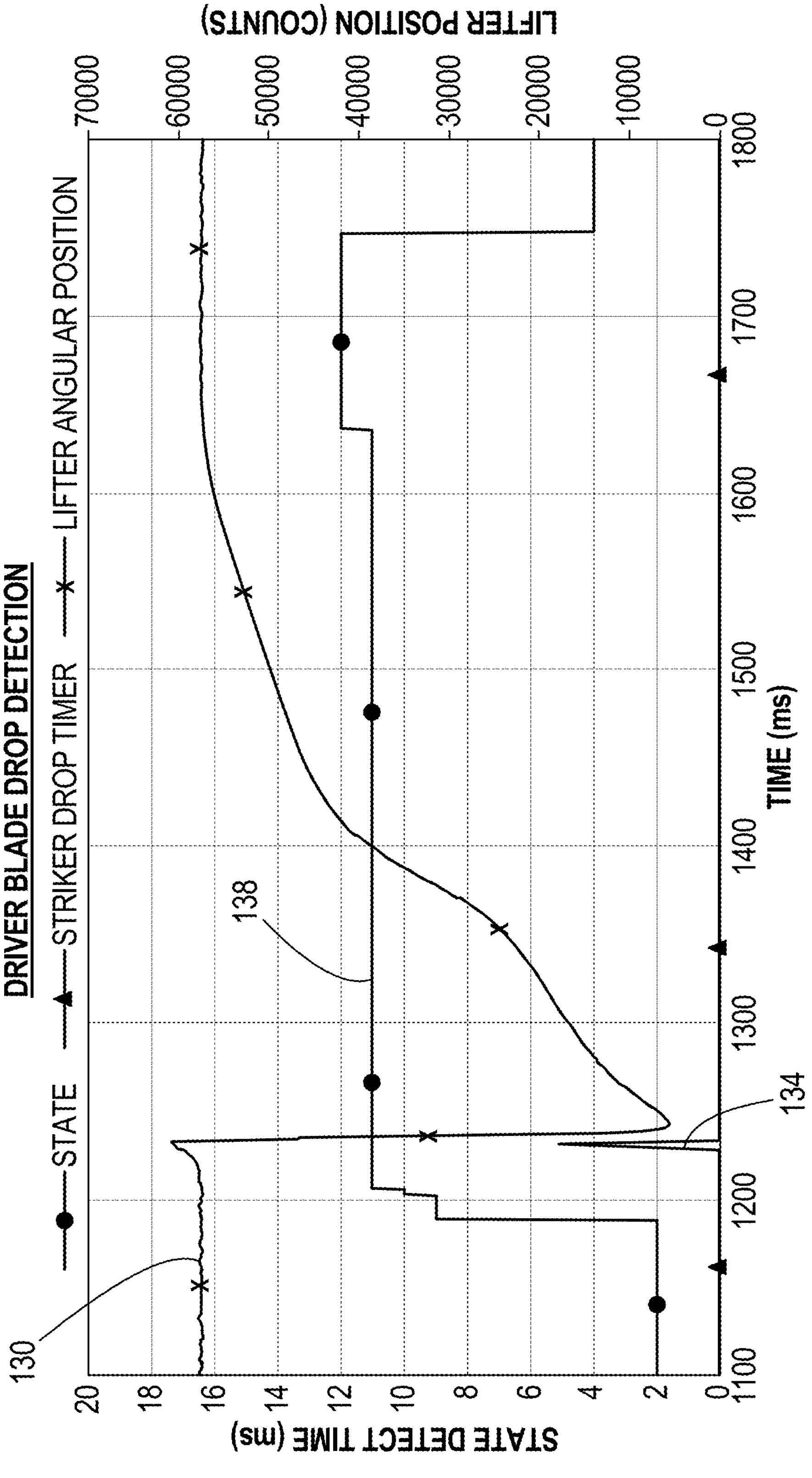
FIG. 6 is a graph illustrating a position of the driver blade during a fire-reload cycle.

For example, a fire-reload cycle (e.g., when the driver blade 26 is released from the TDC position to the BDC position and is returned towards the TDC position) without a jam condition is illustrated in FIG. 6. During the cycle, the processing unit 124 executes a firmware where the lifter sensor 120 detects the position of the lifter 66 (e.g., illustrated as line 130). Concurrently, the processing unit 124 is configured to activate a timer (e.g., illustrated as line 134) and a counter (e.g., illustrated as line 138) once the lifter sensor 120 detects that the lifter 66 moves through a nominal driver blade drop position, which is the position of the lifter 66 when the driver blade 26 is released (e.g., near the TDC position). The controller 110 counts the number of edges detected by the sensors 101 and timestamps the detection of each edge, which defines driver blade edge data. The controller 110 compares the number of detected edges to the predetermined number of edges corresponding to the number of lift teeth 74. Once the controller 110 determines that the number of detected edges corresponds to the predetermined number of edges, the controller 110 activates a driver blade dropped flag. When the driver blade dropped flag is set prior to the predetermined amount of time, the controller 110 determines that a jam condition is not present and continues driving the motor 42 normally to complete the fire-reload cycle.

The controller 110 moves the driver blade edge data to an array in the memory 128 after the driver blade drop flag is activated. Therefore, the controller 110 is store the number of detected edges of the teeth 74 without processor intervention until the predetermined number of edges have been transferred. Concurrently, the controller 110 activates an interrupt service routine (ISR), which disables further transfer of driver teeth edge data to the processing unit 124 until the beginning of the next fire-reload cycle. In other words, the controller 110 disables counting the edges of the teeth 74 until a subsequent fire-reload cycle. This avoids logging potential extra edges when the driver blade 26 bounces after hitting the bumper 98.

The lifter 66 begins to return the driver blade 26 from the BDC position towards the TDC position for a subsequent faster driving cycle. In some embodiments, the controller 110 may not monitor the movement of the driver blade 26 as the driver blade 26 moves to the TDC position. In other embodiments, the controller 110 may monitor movement of the driver blade 26 as the lifter 66 returns the driver blade 26 to a ready position, which is between the BDC position and the TDC position (e.g., if the operator does not actuate the trigger 58 for a subsequent driving cycle). In such an embodiment, the controller 110 may compare the number of detected edges of the teeth 74 to a second predetermined number of edges (e.g., corresponding to a number of lift teeth 74 less than the total number of lift teeth 74). In other words, the controller 110 is configured to determine whether the driver blade 26 reaches the ready position within a predetermined amount of time. In the illustrated embodiment, the predetermined amount of time for a fire reload cycle may be in a range from 200 millisecond to 500 milliseconds while the predetermined time for the driver blade to move from the TDC position to the BDC position is 5 millisecond to 20 milliseconds If, on the other hand, the controller 110 detects less than the predetermined number of edges within the predetermined amount of time while the driver blade 26 is moving toward the BDC position, the controller 110 determines that the driver blade 26 has not reached the BDC position and a jam condition is present. When a jam condition is present, the controller 110 does not activate the striker drop flag and applies a brake to the motor 42 to stop the motor 42 and lifter 66 from rotating. In addition, the controller 110 may activate the indicator 112 to alert the operator that a jam condition has occurred. In some embodiments, the indicator 112 may provide a first indication when the jam condition can be removed by the operator and a second indication when an unclearable jam condition occurs.

Figure 7:
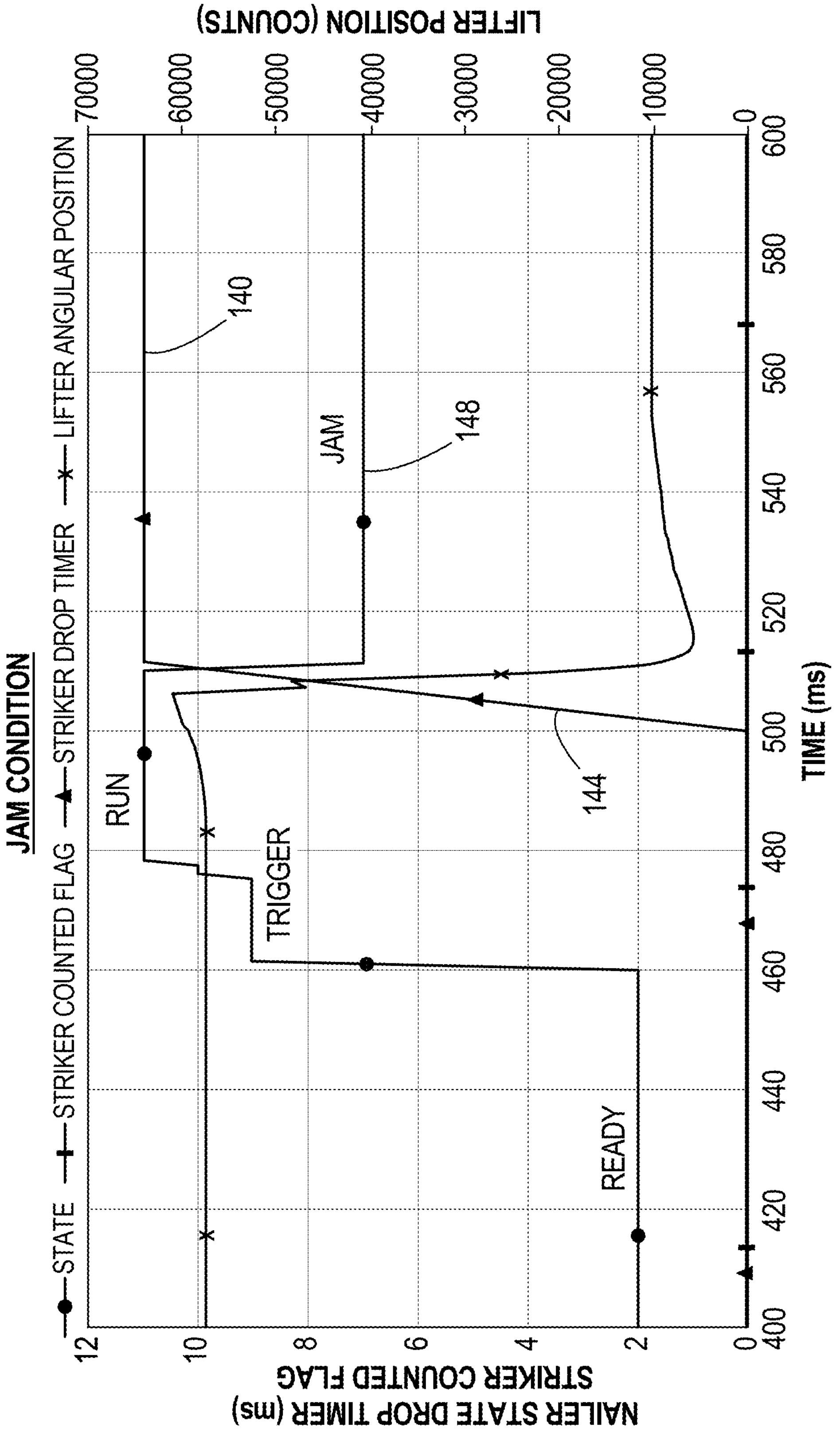
FIG. 7 is a graph illustrating a simulated jam condition of the driver blade.

For example, a fire-reload cycle when a jam condition is present is illustrated in FIG. 7. During the cycle, the processing unit 124 executes a firmware where the lifter sensor 120 detects the position of the lifter 66 (e.g., illustrated as line 140). Concurrently, the processing unit 124 is configured to activate a timer (e.g., illustrated as line 144) and a counter (e.g., illustrated as line 148) once the lifter sensor 120 detects that the lifter 66 moves through a nominal driver blade drop position. The controller 110 counts the number of edges detected by the sensors 101 and timestamps the detection of each edge. The controller 110 compares the number of detected edges to the predetermined number of edges corresponding to the number of lift teeth 74. Once the controller 110 determines that the number of detected edges is less than or does not otherwise correspond with the predetermined number of edges, the controller 110 determines that there is a jam condition, and applies the brake to the motor 42 to stop the motor 42 and the lifter 66 from rotating. Moreover, the lifter 66 is stopped from further rotation to prevent any of the rollers 90 from jamming against or with the lifter teeth 74, which might otherwise damage the drive blade 26.

FIGS. 8-12 illustrate another embodiment of a powered fastener driver 210, with like components and features as the embodiment of the fastener driver 10 shown in FIGS. 1-7 being labeled with like reference numerals plus "200". Only differences between the fastener driver 10 of FIGS. 1-7 and the fastener driver 210 of FIGS. 8-11 are specifically noted herein, such as a lifter position sensing assembly 295 that detects the position of a lifter 266.

The gas spring-powered fastener driver 210 is operable to drive fasteners (e.g., nails, tacks, staples, etc.) held within a magazine 214 into a workpiece. The fastener driver 210 includes a cylinder 218 with a moveable piston 222 positioned within the cylinder 218. The fastener driver 210 further includes a driver blade 226 that is attached to the piston 222 and moveable therewith. The fastener driver 210 includes a housing 230 having a cylinder housing portion 234 and a motor housing portion 238 extending therefrom. The cylinder housing portion 234 is configured to support the cylinder 218, whereas the motor housing portion 238 is configured to support a drive unit 240. The drive unit 240 includes an electric motor 242 and a transmission 282 positioned downstream of the motor 242. In addition, the illustrated housing 230 includes a handle portion 246 extending from the cylinder housing portion 234, and a battery attachment portion 250 coupled to an opposite end of the handle portion 246. A battery pack 254 is removably coupled to the battery attachment portion 250 and supplies electrical power to the drive unit 240. The handle portion 246 supports a trigger 258, which is depressed by a user to initiate a driving cycle of the fastener driver 10.

Figure 9:
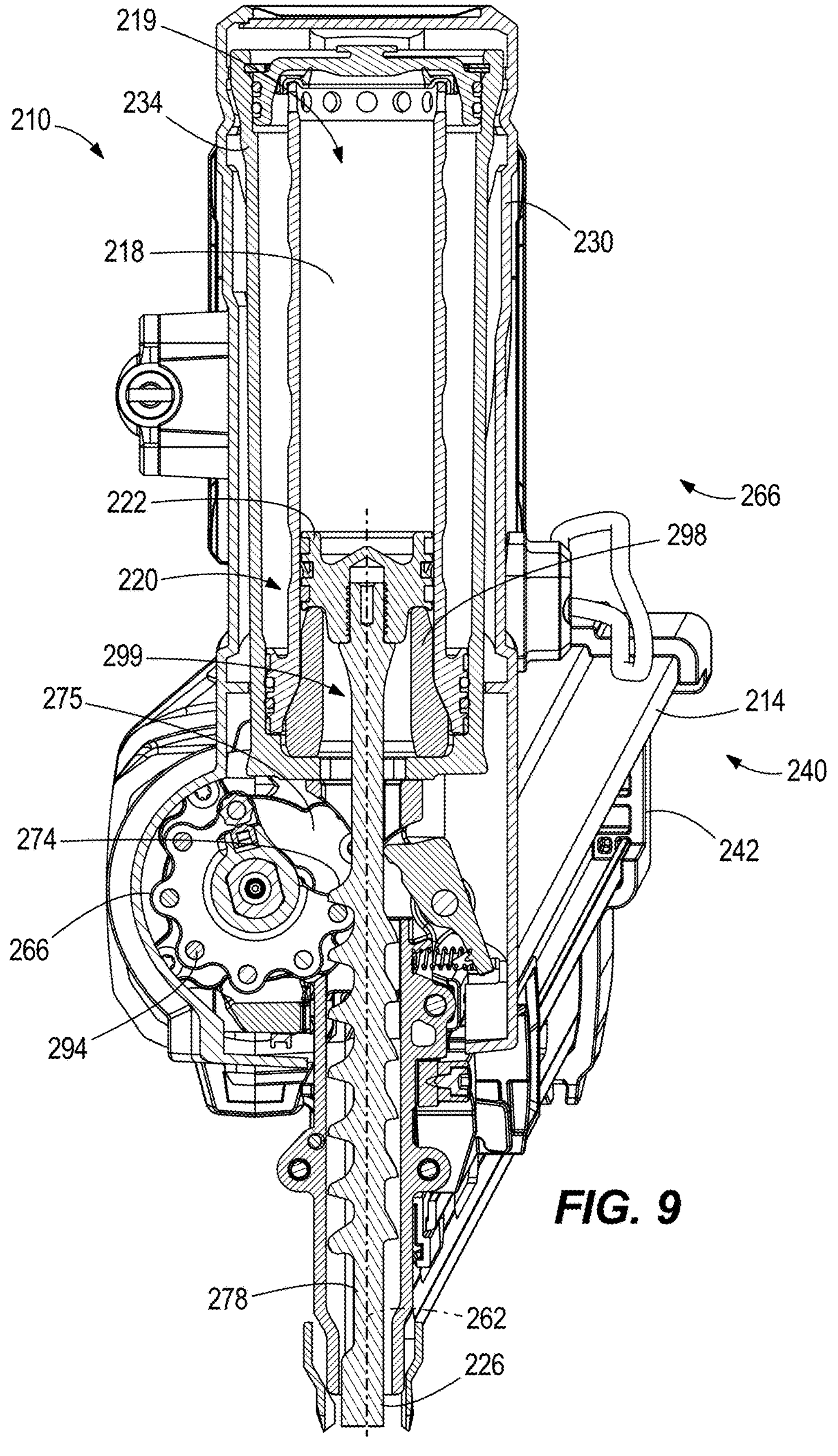
FIG. 9 is a partial cross-sectional view of the gas spring-powered fastener driver of FIG. 8.

With reference to FIG. 9, the driver blade 226 defines a driving axis 262 and includes a plurality of driver blade teeth or lift teeth 274 formed along an edge 278 of the driver blade 226, which extends in the direction of the driving axis 262. In particular, the lift teeth 274 project laterally from the edge 278 relative to the driving axis 262. During a driving cycle, the driver blade 226 and piston 222 are moveable along the driving axis 262 between a top-dead-center (TDC) position and a bottom-dead-center (BDC) or driven position. The driver blade 226 may further be held in a ready position, which is positioned between the BDC position and the TDC position. The piston 222 is adjacent a top end 219 of the cylinder 218 in the TDC position, and the piston 222 is adjacent a bottom end 220 of the cylinder 218 in the BDC position.

Figure 8:
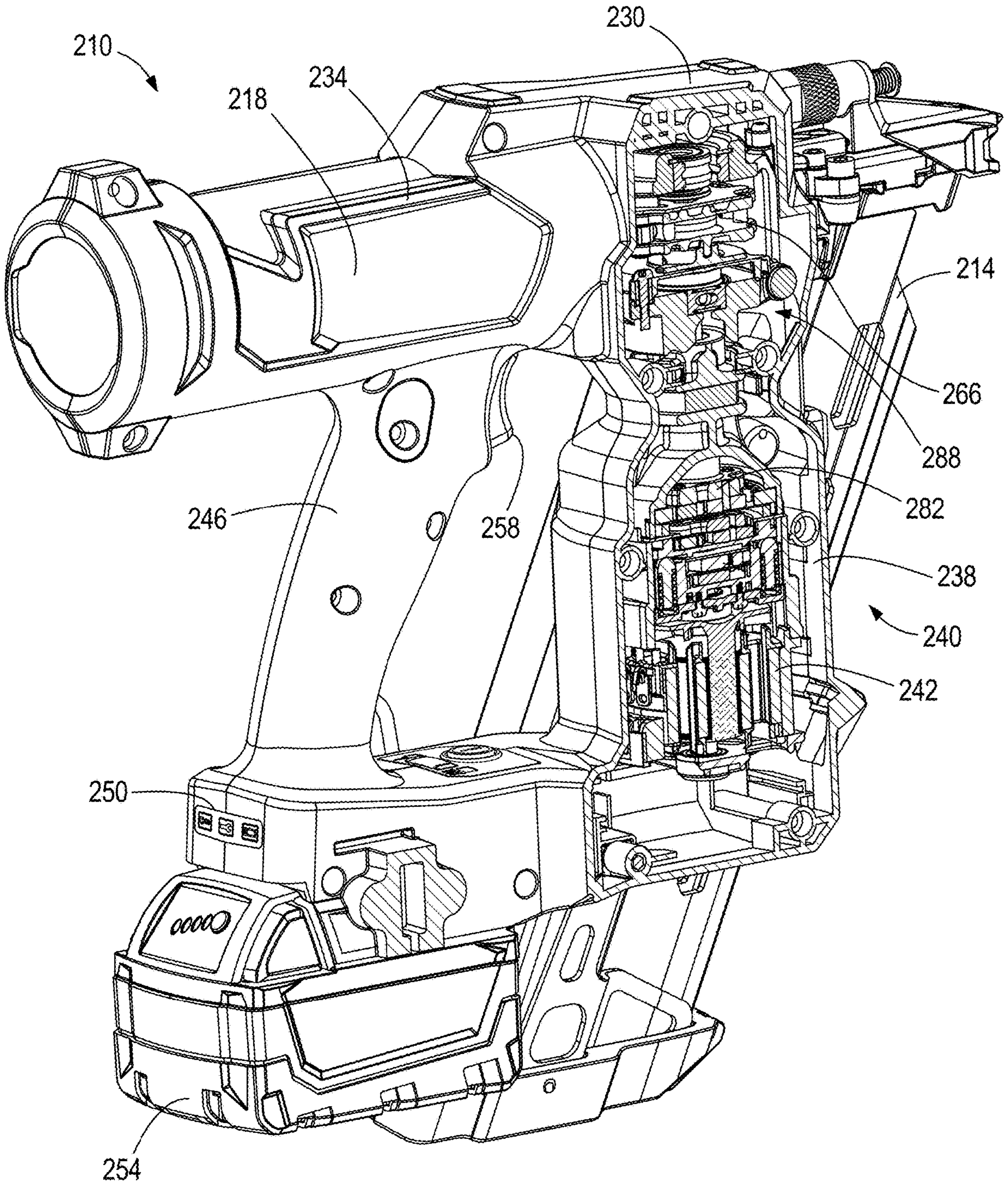
FIG. 8 is perspective cross-sectional view of a gas spring-powered fastener driver in accordance with another embodiment of the invention.
Figure 10:
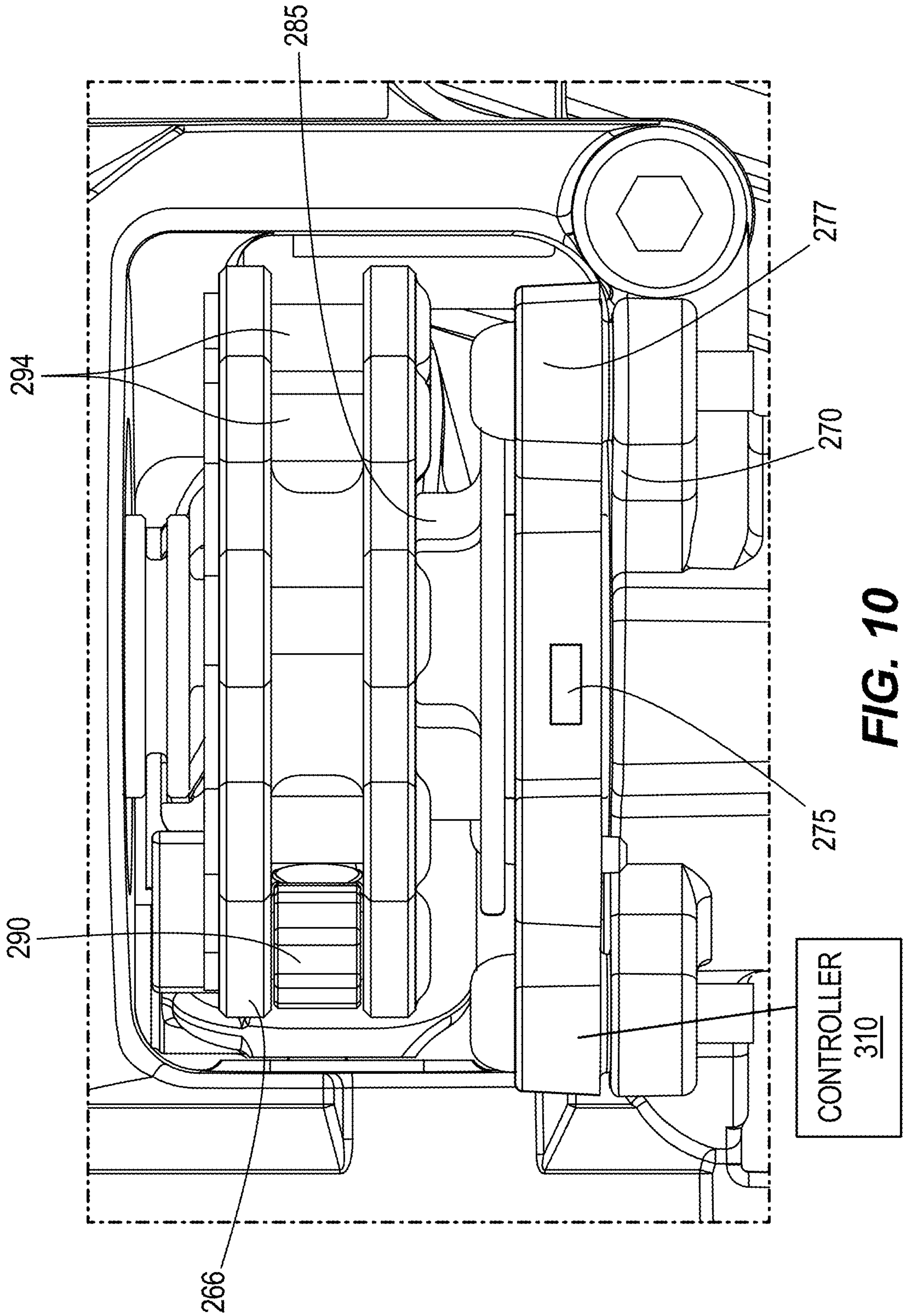
FIG. 10 is a side view of a portion of the gas spring-powered fastener driver of FIG. 8 with portions removed to illustrate a lifter assembly.
Figure 11:
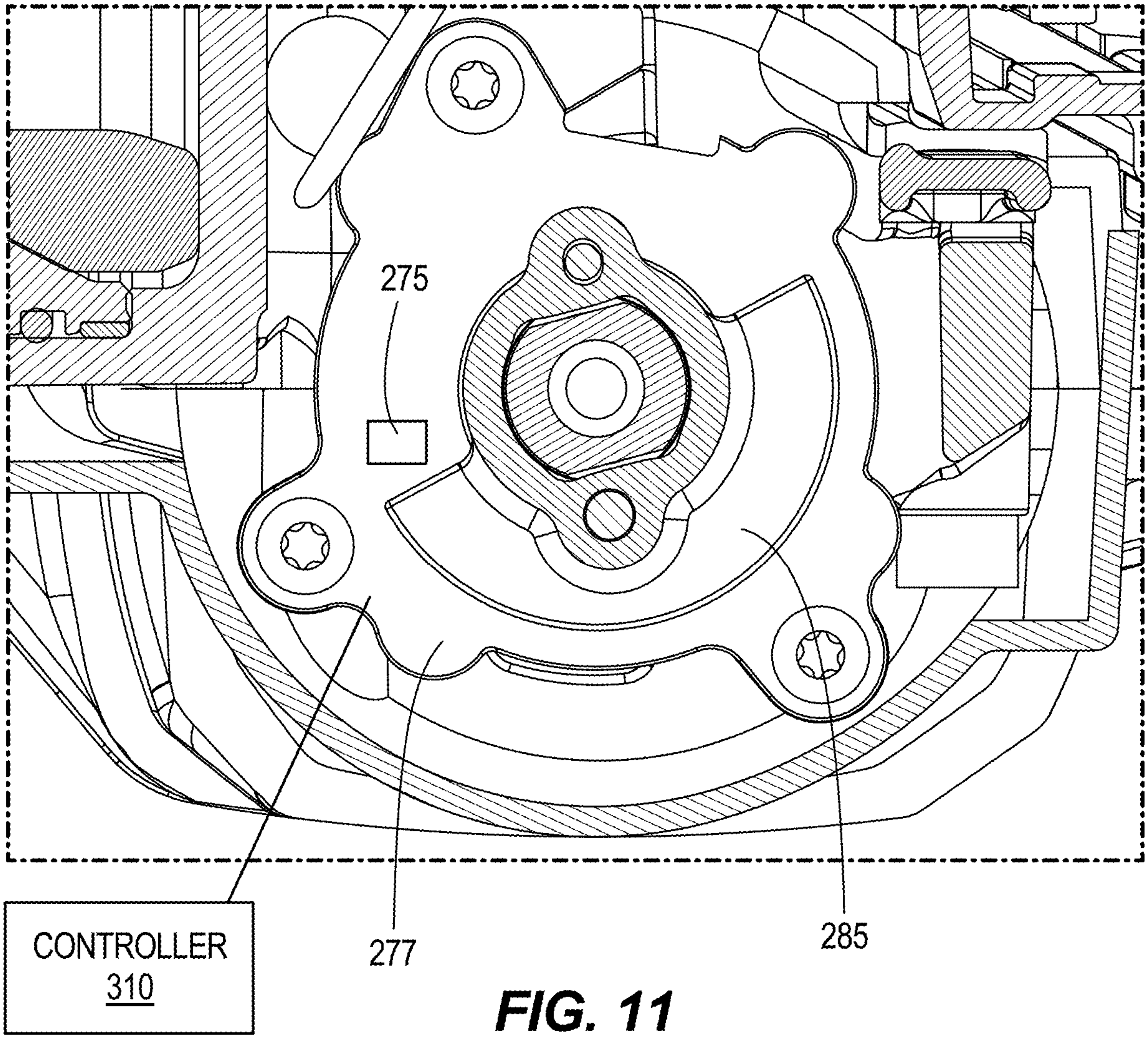
FIG. 11 is a top view of a portion of the gas spring-powered fastener driver of FIG. 8, illustrating a lifter position sensor assembly coupled to the lifter assembly.

The fastener driver 210 further includes a rotary lifter 266 supported within the housing 230 by a frame 270 (FIG. 10). The rotary lifter 266 includes a plurality of pins 294 configured to engage the lift teeth 274 of the driver blade 226. One or more of the pins 294 may include a roller 290 rotatably supported upon the pin 294. The lifter 266 receives torque from the drive unit 240, causing the lifter 266 to rotate. The lifter 266 and the drive unit 240 may be collectively referred to as a lifter assembly 288 (FIG. 8). As the lifter 266 rotates, the pins 294 and the roller 290 sequentially engage the lift teeth 274 formed on the driver blade 226 to return the driver blade 226 along the driving axis 262 from the BDC position toward the TDC position.

The cylinder 218 includes a bumper 298 located at the bottom end 220 of the cylinder 218. The bumper 298 has a generally annular, frusto-conical shape with a central bore 299 therethrough. The bore 299 is coaxial with the driving axis 262 such that the driver blade 226 extends through the bore 299. As the piston 222 and the driver blade 226 move from the TDC position toward the BDC position, the piston 222 impacts the bumper 298, which absorbs the impact from the piston 222 and stops the piston 222 in the BDC position. In some embodiments, the bumper 298 is constructed of a resilient material (e.g., rubber, elastomeric material, or the like.

The fastener driver 210 includes an inductive sensor 275 (schematically illustrated in FIGS. 10 and 11) coupled to the frame 270 by an inductive sensor housing 277, a sensor target 285 coupled for co-rotation with the lifter 266, and a controller 310 in communication with the inductive sensor 275. For example, the controller 310 may include, among other things, a processing unit 324 (e.g., a microprocessor, a microcontroller, or another suitable programmable device) and a memory 328. The sensor target 285 is configured to be sensed or detected by the inductive sensor 275. It should be appreciated that the inductive sensor 275 may be coupled to any portion of the inductive sensor housing 277 so the sensor target 285 can be detected. The inductive sensor 275 and the sensor target 285 together define a lifter position sensing assembly 295 of a jam detection system 200 (FIG. 12), which is described in more detail below. The lifter position sensing assembly 295 is configured to detect the angular position of the lifter 266 and the controller 310 is configured to stop the drive unit 240 in response to detecting that the angular position of the lifter 266 is abnormal during a fastener driving cycle.

The inductive sensor 275 is coupled to the frame 270 at a position below the lifter 266 by the inductive sensor housing 277. In other words, the inductive sensor is positioned between the lifter 266 and the motor 242. The sensor target 285 is separate from the lifter 266 and is made from a different material than the lifter 266 (e.g., for weight reduction). In other words, the lifter 266 is formed of a first material and the sensor target 285 is formed of a second material that is different than the first material (e.g., a lighter material). In other embodiments, the sensor target 285 may be integrally formed with the lifter 266 (e.g., a coating on the lifter 266 or the like). Further, in other embodiments, the inductive sensor 275 may be located above the lifter 266 and on an opposite side of the lifter 266 as the motor 242. The combination of the inductive sensor 275 and the sensor target 285, otherwise known as the lifter position sensing assembly 295, allows the controller 310 to detect a position of the lifter 266 and may be used to detect abnormalities in the operation of the fastener driver 210.

Figure 12:
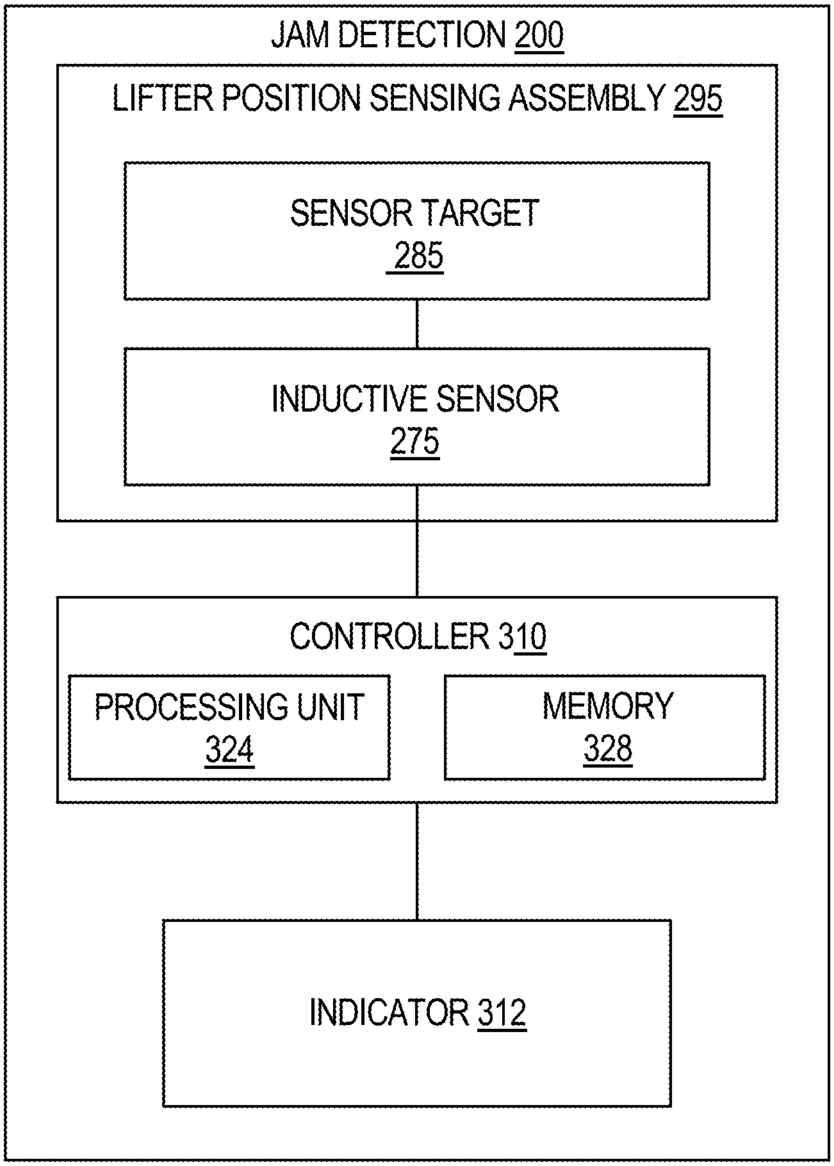
FIG. 12 is a schematic view of a control system of the powered fastener driver of FIG. 8.

Now with reference FIG. 12, the jam detection system 200 includes the lifter position sensing assembly 295, the controller 310, and an indicator 312 in communication with the controller 310. The controller 310 includes a plurality of electrical and electronic components that provide power, operational control, and protection to the components and modules within the controller 310 and/or the fastener driver 210. The indicator 312 may be exposed from an exterior of the housing 230 and may be configured as one or more lights (e.g., a light-emitting diode or LED), a display panel, or the like. The controller 310 may selectively activate the indicator 312 to alert the operator that maintenance is required.

During operation of the fastener driver 210, a jam condition may occur from the driver blade 226 becoming stuck during its driving stroke somewhere between the TDC position and the BDC position. When the driver blade 226 is stuck, the lifter 266 becomes stuck as well, which results in an abnormal angular position of the lifter 266 during the fastener driving cycle. For example, a nail may buckle during a fastener driving cycle if it is unable to fully plunge into an underlying workpiece, jamming the buckled nail within the nosepiece of the driver 210 and preventing the driver blade 226 from reaching its BDC position. If the driver blade 226 is stopped between the TDC and BDC positions, the lifter pins 294 and/or rollers 290 may be unable to correctly mesh with the lift teeth 74, resulting in a jam condition in which the lifter 266 and driver blade 226 remain seized.

The jam detection system 200 is configured to adjust an operating condition of the fastener driver 210 when a jam condition occurs. During a fastener driving cycle, it is assumed that the lifter 266 can rotate 360 degrees (e.g., a single complete revolution) in a predetermined amount of time. As such, the lifter position sensing assembly 295 communicates to the controller 310 to determine whether the lifter 266 rotates 360 degrees within the predetermined time. If not, the controller 310 determines that a jam has occurred. In other words, the controller 310 is configured to stop the drive unit 240 in response to the lifter position sensing assembly 295 not detecting the angular position of the lifter 266 at the end of the fastener driving cycle. For example, the processing unit 324 may activate a timer in response to beginning of the fastener driving cycle (e.g., a user depressing the trigger 258 to activate the drive unit 240). If the controller 310 does not receive an output from the inductive sensor 275 before expiration of the timer (e.g., indicating that the lifter has completed a full revolution), the controller 310 deactivates the drive unit 240. When the jam detection system 200 determines that an unclearable jam condition has occurred, the indicator 312 is activated to alert the operator that maintenance is required.

It should be appreciated that the lifter position sensing assembly 295 described with reference to FIGS. 8-12 may be used in conjunction with the other sensors 101 described in FIGS. 1-7 (e.g., the lifter sensor 120). As such, the description of the lifter sensor 120 applies equally to the lifter position sensing assembly 295.

Various features of the disclosure are set forth in the following claims.

What is claimed is:

1. A powered fastener driver comprising:
- a housing;
- a cylinder within the housing, the cylinder containing a pressurized gas;
- a piston within the cylinder and moveable from a top-dead-center position to a bottom-dead-center position;
- a driver blade moveably coupled to the piston for driving a fastener into a workpiece, the driver blade having a plurality of teeth;
- a lifter configured to engage the plurality of teeth for returning the driver blade from the bottom-dead-center position toward the top-dead-center position;
- a drive unit configured to provide torque to the lifter, causing it to rotate;
- a sensor configured to detect one or more of the plurality of teeth; and
- a controller in communication with the drive unit and the sensor, the controller configured to:
  - count a number of the plurality of teeth detected by the sensor,
  - compare the number of detected teeth to a predetermined number of teeth, and
  - stop the drive unit when the number of detected teeth is less than the predetermined number of teeth.

2. The powered fastener driver of claim 1, further comprising a lifter sensor configured to detect a position of the lifter, and wherein the controller is configured to activate a timer and a counter once the lifter sensor detects that the lifter moves through a nominal driver blade drop position.

3. The powered fastener driver of claim 2, wherein the controller is configured to execute an interrupt service routine when the number of detected teeth is equal to the predetermined number of teeth.

4. The powered fastener driver of claim 3, wherein the interrupt service routine disables the controller from counting the plurality of teeth until a subsequent fire-reload cycle.

5. The powered fastener driver of claim 2, wherein the controller is configured to determine whether the driver blade reaches a ready position within a predetermined amount of time.

6. The powered fastener driver of claim 1, wherein the controller is configured to determine whether the driver blade reaches the bottom-dead-center position within a predetermined amount of time.

7. The powered fastener driver of claim 6, wherein the controller includes a memory, and when the controller determines that the driver blade reached the bottom-dead-center position within the predetermined amount of time, the controller is configured to move data for the number of detected teeth to an array in the memory.

8. The powered fastener driver of claim 6, wherein the controller is configured to execute an interrupt service routine when the controller determines that the driver blade reached the bottom-dead-center position within the predetermined amount of time.

9. The powered fastener driver of claim 8, wherein the interrupt service routine disables the controller from counting the plurality of teeth until a subsequent fire-reload cycle.

10. The powered fastener driver of claim 1, wherein the sensor is an optical sensor having a phototransistor positioned on a first side of the driver blade and an infrared emitter located on an opposite side of the driver blade.

11. The powered fastener driver of claim 1, wherein the predetermined number of teeth are all the plurality of teeth or a portion of the plurality of teeth.

12. A powered fastener driver comprising:
- a housing;
- a cylinder within the housing, the cylinder containing a pressurized gas;
- a piston within the cylinder and moveable from a top-dead-center position to a bottom-dead-center position;
- a driver blade moveably coupled to the piston for driving a fastener into a workpiece, the driver blade having a plurality of teeth;
- a frame supported within the housing;
- a lifter supported within the housing by the frame and configured to engage the plurality of teeth for returning the driver blade from the bottom-dead-center position toward the top-dead-center position;
- a drive unit configured to provide torque to the lifter, causing it to rotate;
- a lifter position sensing assembly configured to detect an angular position of the lifter at an end of a fastener driving cycle, the lifter position sensing assembly including a sensor coupled to the frame and a sensor target coupled for co-rotation with the lifter; and
- a controller in communication with the drive unit and the lifter position sensing assembly, the controller configured to stop the drive unit in response to the lifter position sensing assembly not detecting the angular position of the lifter at the end of the fastener driving cycle.

13. The powered fastener driver of claim 12, wherein the lifter is formed of a first material and the sensor target is formed of a second material different than the first material.

14. The powered fastener driver of claim 12, wherein the sensor target is separate from and coupled to the lifter.

15. The powered fastener driver of claim 12, wherein the sensor target is integrally formed with the lifter.

16. The powered fastener driver of claim 12, wherein the drive unit includes a motor, and wherein the sensor is positioned between the motor and the lifter.

17. The powered fastener driver of claim 12, wherein the sensor is coupled to the frame by a sensor housing at a position below the lifter.

18. The powered fastener driver of claim 12, further comprising a timer configured to be activated in response to a beginning controller of the fastener driving cycle, and wherein the controller is configured to deactivate the drive unit when the controller does not receive an output from the sensor before expiration of the timer.

19. The powered fastener driver of claim 18, wherein the controller is configured to determine whether the lifter rotated 360 degrees before the expiration of the timer.

20. The powered fastener driver of claim 18, wherein the controller is configured to activate an indicator to alert an operator that maintenance is required when the controller does not receive the output from the sensor before expiration of the timer.

* * * * *